Patented Dec. 2, 1952

2,620,276

UNITED STATES PATENT OFFICE 2,620,276

PACKAGE COFFEE DRINK

Wilbert A. Heyman, Lawrence, N. Y.

No Drawing. Application March 2, 1949,
Serial No. 79,310

21 Claims. (Cl. 99—152)

1

This invention relates to a new and novel process of preparing a preserved, ready-to-drink coffee beverage and to the product of such process.

In the preparation of the coffee beverage as is customarily practiced, the green coffee bean is first roasted, then ground and then extracted with hot water to prepare a hot infusion which is to be consumed. There are many methods of preparing the beverage, such as percolator, dripolator, silex or even boiling in an open pot.

In order to prepare a beverage by these methods it is necessary and customary to grind the coffee before extracting with water for otherwise the extraction process would require too long a time to be practical.

It has also been proposed to preserve ready-to-drink coffee beverages in cans and some processes of preparing canned coffee have been patented. For example in Patent No. 2,230,031, Fisher prepared a canned coffee drink by first percolating deaerated, boiling water through ground coffee and then promptly transferring the freshly brewed coffee into the containers, sealing the containers, and thereafter sterilizing the containers and contents. Also Patent No. 2,291,604 discloses an improved process over that of Fisher, the improvement apparently comprising the inclusion of a "sharp" filtering step and vacuumizing treatment prior to filling the liquid coffee extract into the containers.

In both of these processes and in all similar processes known to the inventor the coffee is first brewed and the insoluble coffee solids are eliminated prior to introducing the coffee into the cans. According to the present invention a novel process has been developed which permits the coffee to be introduced into the container before brewing. Aside from the expectable advantages obtained by this process which has not heretofore been considered practical or possible, a number of desirable unexpected results are obtained.

When coffee beans are roasted the heat of roasting develops an extremely minute quantity of one or more nitrogenous substances which give the flavor and aroma to the coffee. Not only are these nitrogenous substances, which are responsible for the odor and aroma, present in extremely small amount, but they are also very volatile and unstable compounds; they are especially susceptible to oxidation.

The following exerpt from a report by Bertrand and Weismeiller illustrates how unstable and minute the flavor and aroma-contributing factor of coffee actually is:

"By distilling the aqueous extract of roasted

2

Mocha coffee Payen obtained a liquid from which he could extract with ether, about 0.002 grain of an aromatic essence, a small quantity of which sufficed to reproduce a strong odor of coffee in a room. This essence later called "Caffeone" by Pelonze and Fremy was made of a very interesting study in 1902 by E. Erdman who succeeded in finding traces of acetic acid, and furfural, proportions of valeric acid and furfural alcohol and a specific nitrogenous substance which was very unstable and possessed the characteristic odor of roasted Mocha coffee, and finally a certain proportion of phenolic substance resembling creosote.

"We found on examining all the volatile products contained in the coffee extract that the substances indicated by Erdman were not the only ones to constitute, when in the mixed condition, the aroma of the extract. Besides the essence extractible by ether, there was dissolved in the aqueous liquor a basic substance which we separated by means of silico tungstic acid, and which we found to be pyridine.

"From 5 kilograms of roasted coffee 7 litres of the distillate were concentrated to twenty ccs. of which 1 to 2 ccs. of a dense slightly soluble oil and an aqueous solution represented all of the active aromatic ingredients and also showed the presence of amyl alcohol, furfural and pyridine."

The heat which is employed for roasting coffee (about 425° F.) also develops carbon dioxide gas so that approximately 100 pounds of gas pressure per cubic inch of coffee is built up in the coffee. If the coffee beans stand for any length of time they lose both carbon dioxide and flavor or if the coffee is ground the rupture of the cells by grinding released large quantities of carbon dioxide and simultaneously a relatively large percentage of the minute amount of desirable aromatic flavor and aroma. If ground coffee is permitted to stand for a few weeks or even a few days after grinding (as is customary) more and more of the rich flavor and aroma is lost due to oxidation. Packing the ground coffee in vacuumized cans or jars may prevent or at least slow down the undesirable oxidation process but even then the flavor and aroma containing constituents emerge from the interior of the coffee cells together with the carbon dioxide gas and collect on or surround the cells instead of being held within them as was the case when the coffee was first removed from the roasting machine. Obviously, after the vacuum sealed container is opened the oxidation process begins and proceeds at a faster rate since the labile aroma and flavor substances are then widely exposed to contact with the air.

In the attempts made heretofore (including the patented processes referred to above) to make an infusion of coffee which is to be subsequently canned or bottled it has always been customary to grind the roasted coffee and then extract it with hot water or cold and hot water. As a result much of the aromatic and flavoring substances are lost during the grinding process and still more are lost during the time required for extracting the infusion before sealing the infusion in the hermetically sealed containers.

The heat employed in roasting coffee develops pyroligneous acids such as acetic and valeric. These acids curdle milk when an infusion of the coffee is heated with an aqueous extract of the coffee containing milk solids. For this reason it has never been possible to sterilize a coffee extract together with a solution of milk. Without sterilization the milk becomes sour and unfit for use.

One of the objects of my invention is therefore to provide a means for preparing a ready-to-drink infusion of roasted coffee in a hermetically sealed container which will keep without spoilage.

Another object of my invention is to provide a ready-to-drink infusion of roasted coffee thereby eliminating the necessity of preparation by the housewife in the usual cumbersome and inefficient manner of the kitchen.

Another object of my invention is to provide a means of making a better quality coffee infusion and at the same time utilize smaller quantities of the coffee bean in doing so.

Another object of my invention is to prepare a better coffee beverage in a hermetically sealed container which contains more of the unoxidized aroma and flavor ingredients of the coffee than has ever prevailed before.

Another object of the invention is to prepare a sterilized coffee beverage in a hermetically sealed container, the said beverage containing an emulsified fatty substance which gives the coffee the appearance and taste of a coffee beverage to which cream has been added.

Another object of my invention is to prepare an infusion of freshly roasted coffee containing more of the low boiling point, volatile aromatic and flavor ingredients.

Another object of my invention is to prepare an infusion of coffee which has been sweetened with sugar containing the usual content of thermophilic bearing bacteria and which has been sterilized at a temperature high enough to render the bacteria inactive, i. e., at 240° F. for at least twenty minutes.

Another object of the invention is to provide a method of making and hermetically sealing a coffee beverage or a coffee concentrate in a container which can be stored and preserved until it is desired to use the coffee without chemical change of its minute amounts of flavor and aroma ingredients.

These objects and others ancillary thereto are obtained by introducing into a container which is adapted to be sterilized, the proper quantity of water and some solid coffee which could ordinarily be extracted with the water only by an excessively prolonged process, sterilizing the mix in the container, sealing the container and permitting the extraction process to continue in the hermetically sealed container which is substantially free of oxygen.

The solid coffee which is added may be in the form of whole roasted coffee beans or it may be freshly ground coffee. A greater economy of coffee is obtained by this process as it is possible to obtain as many as 64 cups per pound of roasted ground or unground coffee whereas the usual kitchen process of preparing coffee yields a maximum of about 40 cups per pound. Enough coffee may be added to produce a ready-to-drink beverage of average strength or the coffee may be made of double, triple or greater strength. When enough coffee is added to produce a concentrate of sufficient strength to produce over three times as much coffee beverage as the capacity of the container special precautions must be taken to obtain a complete removal of the air from the jar since the coffee floats on the water which is added and entrains a considerable amount of air. This extra air can be removed by boiling the water in the container or jar, thereby replacing the air by water vapor. Additional deaerated water can be added after the air has once been driven away from the floating coffee. Another method which may be employed is to attach a fabric net or perforated paper disc to the top of the jar to hold the coffee in place while the jar is substantially completely filled with water.

It is preferred to add the whole coffee beans as in this process the volatiles which are ordinarily lost during grinding are preserved. When the ground coffee is added it may be introduced in the form of a measured amount contained in a tea bag type of container. The tea bag method of making coffee has been tried, heretofore, but has proved unsuitable unless some type of instant coffee extract is added to the coffee in the tea bag. The porous bags permit the extract to diffuse out as a clear infusion without grounds.

The water which is introduced into the container is water which has been previously boiled to remove dissolved oxygen, etc. The water can be hot when introduced or it may be cold, but during or after the can, jar, or other container is being filled, the water is heated so as to sterilize the container and contents. The temperature to which the water is heated may be 180° F. to boiling and in cases where the container is sealed first, the water may be heated under pressure to temperatures above 212° F. (the boiling point at atmospheric pressure) which is the highest temperature heretofore employed in preparing a coffee beverage. The heating of the water has the double purpose of sterilizing the container and its contents and of starting the coffee extraction process.

When the whole coffee beans are employed the containers may be preheated up to about 212° F., the coffee, still hot from the roaster, may be introduced and water heated to about the boiling point may then be introduced. Thus all the components are combined at about the same temperature.

Sugar can be added to the coffee infusion but when sugar is added it is necessary to sterilize the coffee at about 240° F. for about 20 minutes or more to destroy thermophilic bacteria associated with the sugar. This is not necessary if the sugar solution is sterilized before adding it to the coffee.

Milk, cream, skimmed milk or milk powder may also be added to the contents of the container. When such compounds are added it is also necessary to sterilize the contents at about 240° F. for 20 minutes. It has heretofore been impossible to incorporate any milk products with a coffee extract prior to the time coffee is brewed as the pyroligneous acids of the coffee curdle the milk. When whole beans are employed according to this invention there may still be a slight curdling of a portion of the milk but the effect is not serious and the curdled milk can be filtered off with the coffee beans.

Various other modifications of the process or ingredients which may be added are possible, in fact, the solid whole coffee beans may be employed to impart a coffee flavor to any type of liquid food product from which the beans can later be removed. For example, a carbonated beverage can be made by adding cold carbonated water to the container containing the roasted coffee beans or cracked or coarse ground roasted coffee and then heating the container and contents only after sealing and while under pressure. A very delicious coffee flavored dessert with or without cream, milk, cream substitutes (mentioned below) and/or sugar can be prepared by incorporating about 1½–3% of gelatin in the container before adding the water. This dessert can be removed from the container and strained and poured into molds while warm and the molds can then be placed in the refrigerator to harden the liquid. The gelatin appears to absorb some of the volatile flavoring constituents of the roasted coffee.

In a prefered modification, however, a stable fatty or oily substance is added to the coffee to give it the appearance and taste of a coffee containing milk or cream. The oily or oleaginous material may be a purified mineral oil but is preferably an animal or vegetable fat or oleaginous material such as butter fat, cotton seed oil, hydrogenated cotton seed oil, lard, cocoa butter and oleomargarine. Where an animal or vegetable oil or fat is added it is advisable to stabilize the emulsion produced by adding emulsifying agents and/or stabilizers to prevent the stratification of the two phases. Suitable stabilizing compounds are the gums such as gum arabic, gum tragacanth, agar-agar, algins, gelatin and other liquid stiffening agents which are edible. Any of the emulsifying or surface active agents approved by the Food & Drug Administration may be employed. Examples of such emulsifying or surface active agents are the esters of polyhydric alcohols or ambydrides thereof with higher fatty acids such as sorbitan monostearate and the poly alkyleneoxide derivatives thereof such as polyoxyethylene sorbitan monostearate. The vegetable and animal oils or fats which are employed may be defined as "edible oleaginous materials."

The container may be any type of container which is capable of withstanding a sterilization treatment. For example, metal cans, glass bottles and jars, containers made from plastic and plastic laminates and heavy paper containers may be employed. Attention is called to the fact that in electronic ray ovens employed in some hotel kitchens, the water in paper or plastic containers can be boiled and sterilized without directly heating the container.

When metal cans are employed they must be coated with a protective composition such as the copolymer of vinyl chloride and vinyl acetate. Even when so coated, however, the metal cans now available are not entirely satisfactory because when the lid is finally rolled on to seal the can the coating composition is sometimes ruptured. If only a small opening appears in the coating the coffee acids will corrode the tin and iron therebeneath, generating hydrogen gas, causing swelling of the can, etc. This process appears to be accelerated by the presence of sugar in the coffee. This spoilage does not always take place and the problem is a mechanical one which affects the present invention only indirectly.

It has also been found possible to employ flexible water proof bags such as those made from polyethylene, rubber hydrochloride, moisture proof cellophane, laminates of polyethylene with aluminum foil and similar flexible foils capable of withstanding the temperature of boiling water. In such a process the solid coffee, boiling water and other ingredients are placed in the bag, sufficient time is allowed to permit the water vapor to replace the air in the bag or the bag is rolled to eliminate substantially all the air and then sealed. One or more of these bags can then be placed in a tin can or other container and sealed therein.

The time element is the important factor in the present case which permits the use of the whole bean or coarsely ground coffee. The term "coarsely ground" coffee is understood to mean coffee which has been only cracked or more coarsely ground than heretofore considered feasible or economical for the brewing of coffee, for example, coffee with particle sizes such that the particles are incapable of passing through a No. 10 mesh screen the wires of which have a diameter of approximately .025". The coffee bean consists of a hard horny substance which on roasting swells up and becomes somewhat porous. The soluble solids of the coffee bean are interspersed throughout the bean within the cells and cell walls. Some of the cells contain fatty materials and waxes which prevent the water from gaining quick access to the interior thus requiring the grinding of the bean to smaller particles to aid in quicker extraction. But even with finer griding the time for percolating extends from a few minutes to much longer before the coffee is fully brewed. During the brewing process the water dissolves out the various acids, sugars, caffeine, volatile aromas and fixed acids. According to the present invention after the containers have been filled, sealed and sterilized, they are then stored until ready for use. The storing time may be varied to produce the desired extraction time and the temperature of storing may also be changed as desired. Where the coffee is to be consumed while hot, the coffee may be heated before removing from the container. Such heating may be done automatically in a check or coin controlled vending apparatus.

The ability to sterilize the product is an important feature of the present invention. The temperature and time for the sterilizing treatment depend upon the size of the containers and whether sugar, milk or other ingredients have been added.

Coffee beans are fermented in the process of curing and they are filled with spores and bacteria which are not killed during the roasting process in spite of the high temperatures used in roasting. Besides, the infusion is the extract of a seed and as such is one of the most excellent mediums of the propogation of mold, yeast and bacteria. In the case of sealing the cans under vacuum it is found that the temperature of the water can be slightly raised depending upon the vacuum used, but always low enough so that the contents of the can will not boil out when subjected to the predetermined vacuum. By removing all the air I make place for the carbon dioxide which will be given off from the roasted coffee beans when the cells are softened by the water, and I also remove the cause of oxidation of flavor ingredients, where large cans are employed it is necessary to predetermine the length of time required for raising the temperature of the contents of the cans to the lethal point and add this time to the twenty minutes or other period of time required for complete sterilization.

The novel features characteristic of this invention are set forth with particularity in the appended claims. The invention itself however, both as to its organization and its method of operation, together with additional objects and advantages thereof, will best be understood from the following description of specific embodiments when read in connection with the accompanying examples:

Example 1

A clean container such as a tin can coated with the proper material (for example, the copolymer of vinyl chloride and vinyl acetate) to prevent the tanic acid of the coffee from acting on the iron of the can is preheated to about 212° F. Into the can of six ounce capacity about ¼ ounce of whole bean coffee is introduced.

A coffee which has been roasted not more than four hours before (and preferably direct from the roaster) to insure recovering the maximum of fresh flavor is preferred. After the coffee beans are in the can, the can is immediately filled with boiling water, and sealed. The boiling water serves two important purposes, first, the heat of the water will expand the air in the can and cause the head space to be occupied by vapors which will drive out substantially all of the oxygen. This effect may be aided by blowing a stream of steam into the can or passing the filled can through a hot space to make the water boil slightly before sealing, thereby insuring the removal of the air. The second purpose of the boiling water is to sterilize the contents of the can, and it is important to permit this heat to remain for sufficient time, say 15 minutes to insure the killing of all spores and bacteria, thereby insuring that the contents of the can will remain sterile indefinitely. After the time limit has expired the sealed can is then submerged in cold water to cool it sufficiently to permit packing. The vacuum which is formed draws out the flavor. The quarter ounce of roasted coffee contains about 25% soluble solids which will amount to about 1.75 to 2 grams of soluble coffee solids. Most of these solids diffuse out into the six ounces of water after a few hours of contact with the unground whole coffee beans, thereby insuring the maximum of extraction from the coffee and preparing an excellent cup of coffee from only a small amount of roasted coffee. The aroma constituents of the coffee as well as the non volatile solids are imparted to the water in the absence of air, in their entirety. In other words the aroma and flavor ingredients are not lost in grinding and storage as is the custom when the coffee is ground before it is extracted. There is no air present to destroy the aroma during the preparation of the infusion.

Inasmuch as there are no thermophilic bacteria in the coffee used alone without sugar, it is not necessary to heat the contents of the can higher than 190° F. for twenty to thirty minutes. In other words, it is sufficient to add boiling water and maintain the contents of the can at the temperature of between 190° and 212° F. for about thirty minutes at the maximum after which the cans are cooled to the temperature required for labeling and packing. But in the case of sweetened coffee in which the sugar used often carries with it thermophilic bacteria, it is essential to either sterilize the cans containing the whole coffee beans and water to a temperature of 240° F. for about twenty minutes or sterilize the sugar solution before adding it to the can.

Example 2

A heat resisting glass jar is prepared by cleaning and preheating and the coffee and water are added as in Example 1. Two level teaspoons of sugar (or any amount desired) are also added. The water in the jar is boiled so as to drive out air and dissolved oxygen and the can is sealed hot. Thereafter the can and its contents are heated to 240° F. in a closed retort and maintained at this temperature for twenty-five minutes. The heating may be done under pressure in an autoclave if desired. This example in addition to illustrating how a sweetened coffee is prepared from unsterilized sugar, shows how it is possible to prepare a coffee infusion at temperatures higher than the boiling point of water.

Example 3

The process is conducted as in Example 1 except that a glass jar is employed, and the coffee and the deaerated water are added at ordinary room temperature.

The jar is then sealed under a high vacuum and the jar and contents are then sterilized at 160°–212° F. for 20 minutes (plus heating time) after which the can is cooled and stored until ready for use.

Example 4

A clean glass container having a capacity of about one gallon is prepared and about 22 ounces of whole coffee beans are introduced therein. Water containing about 4 ounces of sugar and 4 ounces of powdered skimmed milk per gallon which has been heated to about 212° F. is then poured over the beans in the container to fill the same. The container is closed at once and sent to the retort where the container and contents are heated to 240° F. and maintained at this temperature for at least 20 minutes. Thereafter the containers and contents are rapidly cooled. The milk is thereby cooled below the point where coagulation in its entirety takes place and before the water has had time to extract all of the soluble coffee solids from the beans. When cold a vacuum is created in the container.

Example 5

The process is conducted as in Example 4 except that cold water, milk solids and sugar are added to the glass can separately, the can is sealed under high vacuum and the water is heated in the presence of the coffee and milk to sterilize the same, only after the can is sealed.

Example 6

The process is conducted as in Example 1 except that in place of the ¼ ounce of whole coffee beans, a small porous bag (similar to a tea bag) containing about ¼ ounce of ground fresh roasted coffee is introduced into the can. If desired the bag can contain whole coffee beans as well as the ground coffee. The sealed can which results may be easily separated into the liquid (for drinking) and the solid coffee in the tea bag which is discarded.

Example 7

A 40 ounce glass jar is preheated to the temperature of boiling water and 50 g. (about 1.75 oz.) of whole coffee beans fresh from the roaster (and also at a temperature of over 200° F.) are introduced into the jar. Oxygen free water at about the boiling point is added in such a quantity that the beans which float therein will not be discharged from the jar. The jar and contents are then passed to a vacuum chamber and the water is permitted to boil for a sufficient time to replace the air between that part of the coffee beans which are above the water with water vapor. The container is removed from the vacuum means and any water which has been lost is made up by adding more water. A two piece cap sealing means comprising a disk with a rubber gasket and a threaded sleeve member is then loosely fitted onto the jar. The jar is finally heated to 205° F. and held at the temperature for 25 minutes to sterilize the contents and the cap is then tightened. The jar is then cooled and stored.

Example 8

A 40 oz. glass jar is heated, filled with coffee and water and treated as in Example 7 except that 100 g. (3.5 oz.) of coffee is added to prepare a coffee of double strength instead of the 50 g. of Example 7.

Example 9

A 40 oz. glass jar is heated filled with coffee and water and further treated as in Example 7 except that 200° g. (7 oz.) of whole coffee beans are added to prepare a very concentrated coffee. This much coffee takes up a considerable amount of the volume of the jar and leaves a considerable amount of air space and special precautions must be taken to remove the air from between the coffee beans. Thus the water first added to the jar must be boiled (preferably under a vacuum for several minutes) to assure replacement of all the air by water vapor and the water lost during boiling must be replaced. The coffee infusion which results after sterilizing, sealing and storing the jar is more than 4 times as strong as that of Example 7 because the space occupied by the 200 g. of beans replaces a considerable amount of water in the jar.

Example 10

The process is conducted as in Example 8 except that a jar having a separable rubber gasket is employed. After adding the coffee but before adding the water to this jar a tightly fitting gasket containing a net-like restraining center portion of about the texture of ordinary cheese cloth is fitted over the jar. The jar is then substantially completely filled with water so that the coffee beans are held in the jar only by the net-like restraining member. This container and contents are then vacuumized, the lid is loosely attached, the contents sterilized and the lid is finally tightened.

Example 11

To 3¾ oz. of purified and hydrogenated cottonseed oil, 20 grams of polyoxyethylene sorbitol mono-stearate and 20 grams of sorbitol mono-stearate are added and the components thoroughly mixed to form a homogeneous solution. This oil mixture is then prepared for mixing with the coffee by adding about one gallon of water which gives the product a milky appearance. The vegetable fat provides substantially the same nutritional effect as added cream or milk.

This mixture is then added with the water in suitable proportion to the container and the process is carried out as set forth in Example 1. This amount of emulsion is sufficient to impart a milky color and flavor to about 5–6 gallons of coffee.

As explained, heretofore milk requires sterilization temperature of 240° F. for a period of at least 20 minutes, the above described mixture of fats and stearate derivatives provides a colloid material which will give the appearance of milk but does not require a temperature higher than 212° F. for sterilization of both it and the coffee. This, therefore will greatly speed up the production of the finished product and at the same time provide a more pleasing coffee beverage than one with the milk for those who prefer a milky product.

Example 12

To 4 oz. of purified hydrogenated vegetable oil, 20 grams of polyoxyethylene sorbitol, 4 oz. of gum arabic, 1 oz. of gum tragacanth, and 6 gallons of water are added and the mix is run through a homogenizer or colloid mill. The mix is then employed as a milk flavored water and added to the container in place of the water as in Example 1.

Example 13

To 4 oz. of pure creamery butter 10 g. of polyoxyethyline sorbitol mono-oleate and 10 g. of sorbitol monoleate are added and the components are gently heated and thoroughly mixed. About 1 pint of water is then added and the mix is passed through a colloid mill. This mix is then employed as a "cream" and added in place of the milk to the composition of Example 4.

Example 14

To 10 oz. of a hydrogenated vegetable fat 20 g. of sorbitan monostearate and 20 g. of the polyethylene derivative of sorbitan monostearate and 10 g. of benzoate of soda. This mixture is heated to 125–160° F. until a homogenous melted composition is obtained. This melt is poured into a quart of warm water while simultaneously violently agitating the water. The resulting suspension or emulsion is then passed through a homogenizer at 2500 pounds pressure. This forms a creamy emulsion. One to two teaspoons of this emulsion is added to a six oz. beverage bottle containing ¼–½ oz. of whole bean roasted coffee which has been substantially filled with air free water. The container and contents are heated to boil the water and the bottle is sealed with a bottle cap. The heat of the water sterilizes the contents of the bottle and the water extracts the flavoring materials from the coffee beans while the creamed fat forms a milky or creamy emulsion and requires no further sterilization to preserve it.

Example 15

¼ to ½ oz. of whole and cracked roasted coffee beans are placed in a tea bag and this tea bag is placed in a flexible polyethylene bag capable of holding about 6 oz. (liquid measure) with a space remaining at the top to permit folding and/or sealing. Six oz. of boiling water are added to the bag and the bag is passed to a vacuum chamber to permit the water vapor to replace air in the top of the bag. The top of the bag is then heat sealed and the bag is placed in a tin can of substantially the same size and the tin is then sealed. The sealed tin containing the bag of coffee may be further sterilized at 240° F. if desired.

*Example 16*

A strong, heat-resistant, bottle of six ounce capacity is cleaned and ¼ oz. of whole coffee beans are inserted. To this bottle a presterilized sugar solution equivalent to about ¼ oz. of sugar is added and then the bottle is substantially filled with highly charged carbonated water. The bottle is permitted to stand until the carbon dioxide gas given off by the water has had a chance to displace the air from between the coffee beans and at the top of the bottle. This bottle is then capped and placed in an autoclave and subjected to a temperature of 212° F. for 20 minutes while maintaining the bottle under gas pressure to prevent breakage of the bottle and removal of the cap.

*Example 17*

The process is conducted as in Example 2 except that 2% of gelatin (based on the water content of the jar) is added prior to adding the water. The resultant coffee flavored gelatin solution which results is liquid at ordinary temperature so that it can be poured from the container through a strainer to remove the coffee beans and into molds. The gelatin in the molds can then be hardened in a refrigerator.

When it is desired to consume a cup of coffee made according to the present invention, the container containing the coffee may be heated or cooled before or after the coffee is removed from the container. The solid constituents are separated from the coffee by straining, by decanting or by making only a small opening in the container. The whole coffee beans will be swollen to two or more times their normal dimensions when finally removed from the container. Where the coffee bag is employed the insoluble coffee solids in the bag are easily separated or removed from the infusion.

It can readily be seen that my invention utilizes more of the rich coffee flavor and aroma than has ever been obtained before and at the same time prepares the first coffee beverages in cans which contains all of the flavor and the soluble solids of the coffee.

I claim:

1. A process of making a preserved coffee beverage comprising the steps of introducing solid coffee the individual particles of which are large enough to be retained on a No. 10 mesh screen, and water into a container capable of being hermetically sealed and sterilized, sealing and sterilizing the contents of the container and storing the sterilized container to permit the desired infusion of the coffee.

2. A process of making a preserved coffee beverage comprising the steps of introducing solid coffee the individual particles of which are large enough to be retained on a No. 10 mesh screen, sugar, and water into a container capable of being hermetically sealed and sterilized, sealing and sterilizing the contents of the container at a temperature sufficient to destroy the thermophillic bacteria of said sugar and storing the sterilized container to permit the desired infusion of the coffee.

3. A process of making a preserved coffee beverage comprising the steps of introducing solid coffee the individual particles of which are large enough to be retained on a No. 10 mesh screen, milk, and water into a container capable of being hermetically sealed and sterilized, sealing and sterilizing the contents of the container before any substantial proportion of the pyroligneous acids are extracted from the coffee and storing the sterilized container to permit the desired infusion of the coffee.

4. A process of making a preserved coffee beverage comprising the steps of introducing solid coffee the individual particles of which are large enough to be retained on a No. 10 mesh screen size, sugar, milk, and water into a container capable of being hermetically sealed and sterilized, sealing and sterilizing the contents of the container at a temperature sufficient to destroy the thermophillic bacteria of said sugar and storing the sterilized container to permit the desired infusion of the coffee.

5. A process of making a preserved coffee beverage comprising the steps of introducing solid coffee the individual particles of which are large enough to be retained on a No. 10 mesh screen large particle size, and water into a container capable of being hermetically sealed, adding an emulsion of an edible oleaginous material containing a small amount of a surface active agent adapted to maintain the oleaginous material in emulsified condition to the said container in sufficient proportion to produce a milky haze in the liquid product, sealing and sterilizing the contents of the container and storing the sterilized container to permit the desired infusion of the coffee.

6. A process of making a preserved coffee beverage comprising the steps of introducing solid coffee the individual particles of which are large enough to be retained on a No. 10 mesh screen, sugar, and water into a container capable of being hermetically sealed and sterilized, adding an emulsion of an edible oleaginous material containing a small amount of a surface active agent adapted to maintain the oleaginous material in emulsified condition to the said container in sufficient proportion to produce a milky haze in the liquid product, sealing and sterilizing the contents of the container at a temperature sufficient to destroy the thermophillic bacteria of said sugar and storing the sterilized container to permit the desired infusion of the coffee.

7. A process of making a canned coffee beverage comprising the steps of introducing whole coffee beans, and water into a container capable of being hermetically sealed and sterilized, sealing and sterilizing the contents of the container and storing the sterilized container to permit the desired infusion of the coffee.

8. A process of making a canned coffee beverage comprising the steps of introducing whole coffee beans, sugar, and water into a container capable of being hermetically sealed and sterilized, sealing and sterilizing the contents of the container and storing the sterilized container at a temperature sufficient to destroy the thermophillic bacteria of said sugar to permit the desired infusion of coffee.

9. A process of making a canned coffee beverage comprising the steps of introducing whole coffee beans, milk, and water into a container capable of being hermetically sealed and sterilized, sealing and sterilizing the contents of the container and storing the sterilized container before any substantial proportion of the pyroligneous acids are extracted from the coffee to permit the desired infusion of the coffee.

10. A process of making a canned coffee beverage comprising the steps of introducing a porous bag containing roasted coffee which is at least partially ground and water into a container capable of being hermetically sealed and sterilized, sealing and sterilizing the contents of the container and storing the sterilized container to permit the desired infusion of the coffee.

11. A process of making a canned coffee beverage comprising the steps of introducing whole coffee beans, and water into a container capable of being hermetically sealed and adding an emulsion of an edible oleaginous material containing a small amount of a surface active agent adapted to maintain the oleaginous material in emulsified condition to the said container in sufficient proportion to produce a milky haze in the liquid product, sealing and sterilizing the contents of the container and storing the sterilized container to permit the desired infusion of the coffee.

12. A process of making a canned coffee beverage comprising the steps of introducing a porous bag containing roasted coffee which is at least partially ground and water into a container capable of being hermetically sealed and adding an emulsion of an edible oleaginous material containing a small amount of a surface active agent adapted to maintain the oleaginous material in emulsified condition to the said container in sufficient proportion to produce a milky haze in the liquid product, sealing and sterilizing the contents of the container and storing the sterilized container to permit the desired infusion of the coffee.

13. As a new packaged product a hermetically sealed container containing roasted coffee and a water infusion thereof formed in situ in said container.

14. As a new packaged product a hermetically sealed container containing whole roasted coffee beans and a water infusion thereof formed in situ in said container.

15. As a new packaged product a hermetically sealed container containing sugar, whole roasted coffee beans, and a water infusion thereof formed in situ in said container.

16. As a new packaged product a hermetically sealed container containing a dispersion of edible fats, roasted coffee and a water infusion thereof formed in situ in said container.

17. As a new packaged product a hermetically sealed container containing roasted coffee enclosed in a porous bag and a water infusion thereof formed in situ in said container.

18. As a new packaged product a hermetically sealed bottle containing sugar, whole roasted coffee beans and a carbonated water infusion thereof formed in situ in said container.

19. As a new package product a preserved ready-to-drink coffee beverage sealed into a thin flexible moisture proof-bag, which bag is also resistant to the temperatures of boiling water said bag containing solid coffee particles, the individual particles of which are large enough to be retained on a No. 10 mesh screen, the said beverage and bag being in turn sealed into a supporting container of relatively inflexible material.

20. As a new packaged product, a hermetically sealed container containing gelatin, whole roasted coffee beans and a water infusion thereof formed in situ in said container.

21. A process of making a canned coffee beverage comprising the steps of heating a container capable of being hermetically sealed and sterilized, introducing freshly roasted coffee beans while still hot from the roasting process into said container, adding water heated to approximately the boiling point thereof to substantially fill said container, sealing and sterilizing said container and contents and thereafter storing the said container to permit the desired infusion of the coffee.

WILBERT A. HEYMAN.

REFERENCES CITED

The following references are of record in the file of this patent:

UNITED STATES PATENTS

| Number | Name | Date |
|---|---|---|
| 1,478,908 | Oldham | Dec. 25, 1923 |
| 2,288,284 | Kellogg | June 30, 1942 |
| 2,291,604 | Baselt | Aug. 4, 1942 |
| 2,338,608 | Weisberg | Jan. 4, 1944 |
| 2,340,989 | Salkin | Feb. 8, 1944 |
| 2,380,134 | Waters | July 10, 1945 |
| 2,435,743 | Geimer | Feb. 10, 1948 |

OTHER REFERENCES

"Report of an Investigation of Coffee" by Prescott, 1924, page 11.